Nov. 15, 1932. C. F. CLAMPITT 1,887,869
BIRD CAGE
Filed Sept. 23, 1931
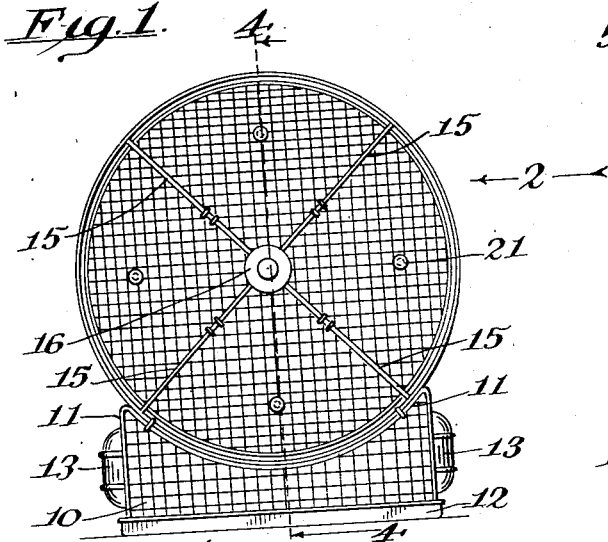
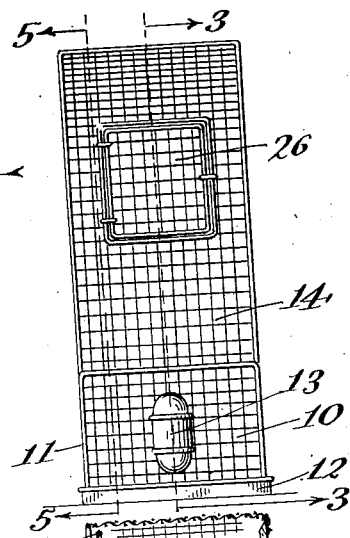
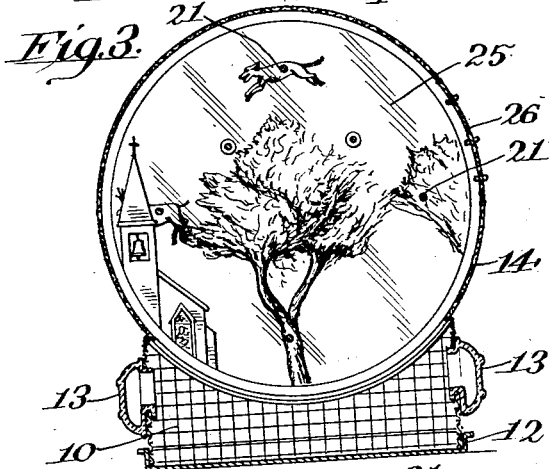
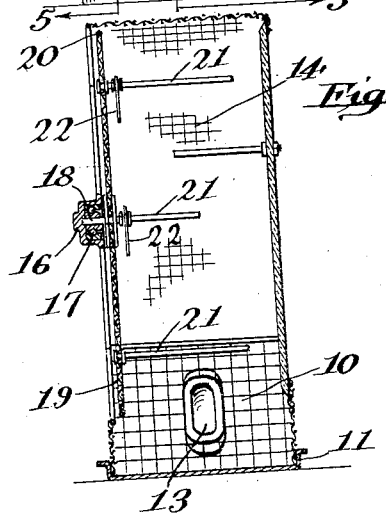
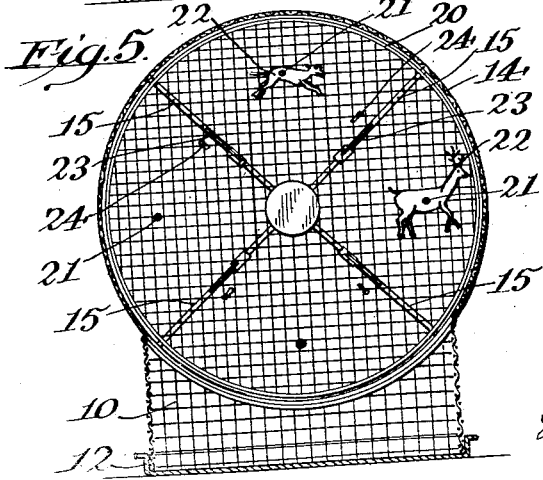
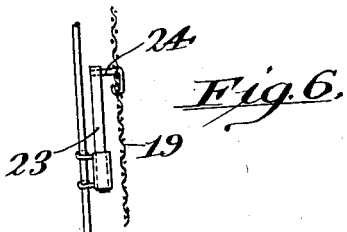
Inventor
Charles F. Clampitt.

Patented Nov. 15, 1932

1,887,869

UNITED STATES PATENT OFFICE

CHARLES F. CLAMPITT, OF NORTH HOLLYWOOD, CALIFORNIA

BIRD CAGE

Application filed September 23, 1931. Serial No. 564,541.

My invention relates to a bird cage and the principal objects of my invention are, to provide a bird cage having a revolving member that includes perches that are offset relative to the axis of the revolving member so that the weight of a bird on the perches will cause the revolving member to operate and further, to arrange in the rear portion of the cage a mirror or reflecting member and which latter will reflect the revolving member and the bird or birds that rest on the perches thereof.

Further objects of my invention are, to mount small animal representing figures upon the forward portions of the perches that are carried by the revolving member and which figures in motion are reflected by the mirror or reflecting surface in the rear portion of the cage, further, to provide a mirror or reflecting surface having the representation of trees, foliage, buildings and the like on its surface so as to produce novel effects while the revolving member carrying the animal representing figures and the bird or birds mounted on the perches is in operation and further, to provide a cage having means for producing tinkling sounds while the revolving member is in operation.

With the foregoing and other objects in view, my invention consists in certain novel features of construction and arrangement of parts that will hereinafter be more fully described and claimed and illustrated in the accompanying drawing in which:

Fig. 1 is a front elevational view of a bird cage constructed in accordance with my invention.

Fig. 2 is a side elevational view of the cage.

Fig. 3 is a vertical section taken on the line 3—3 of Fig. 2.

Fig. 4 is a vertical cross section taken on the line 4—4 of Fig. 1.

Fig. 5 is a vertical section taken on the line 5—5 of Fig. 2.

Fig. 6 is a detail section showing one of the devices for producing tinkling sounds as the revolving member is in operation.

Referring by numerals to the accompanying drawing which illustrates a practical embodiment of my invention, 10 designates the lower or base portion of my improved cage which is substantially rectangular in form and composed of a frame 11 of wire that supports front, rear and end walls of suitable wire netting. The lower end of this base portion of the cage is closed by a readily removable pan 12, of sheet metal, and removably positioned on the ends of the body 10 and coinciding with openings therein, are cups 13, of glass or metal and which serve as containers of food and water for the birds that occupy the cage.

Surmounting the member 10 is a substantially circular wall 14, formed of suitable wire netting that forms the main body of the cage and secured to the front edge of this wall 14 are the outer ends of a series of radially disposed wires, the inner ends of which are connected to a small housing 16 that encloses suitable antifriction bearings 17 for a short shaft or axle 18.

Secured to the inner end of this shaft or axle is a circular member 19, formed of suitable wire netting and which forms the front wall of the cage.

The marginal edge of this front wall 19 is secured to a hoop 20 of wire and the latter is positioned immediately adjacent to the front edge of the wall 14.

Secured to and projecting rearwardly from the front wall 19, is a plurality of perches 21, the same being located between the axis 18 and the outer edge of said wall and thus when a bird alights on any one of the perches that is to one side or the other of the vertical plane occupied by the axis 18, the revolving member comprising the wall 19 and the perches 21, will be caused to revolve, due to the overbalance produced by the bird on the perch.

Loosely mounted on each perch 21, adjacent to the point where the same unites with the front wall 19, is a small figure 22, preferably formed of metal and shaped so as to represent an animal or a bird and these figures are arranged so that the greatest weight thereof is located below the axis formed by the perch so that said figures will always retain a normal upright position.

Secured in any suitable manner to the rods or wires 15 and disposed rearwardly thereof, are short sections 23 of thin tempered metal such as steel and which when vibrated will produce a tinkling sound.

Secured to the front wall 19 of the cage and projecting outwardly therefrom are short arms or fingers 24, which as the revolving portion of the cage operates successively strike against the resilient members 23 and in passing the same they will cause said members to vibrate and thereby produce tinkling sounds.

It is a well established fact that caged singing birds and particularly canaries, are induced to sing by soft musical sounds, whistling or the sound of running water and I have demonstrated in practice that canary birds may be induced to sing as a result of the tinkling sounds produced by small resilient strips of metal when struck and vibrated rapidly after the manner of a tuning fork.

The rear wall of the cage and which is enclosed by the rear edge of the circumferential wall 14, comprises a disc or plate 25 and which has a reflecting inner surface.

As a result of this arrangement the revolving member, the figures 22 and the bird or birds that rest upon the perches 21, are reflected by the surface of the disc or plate 25 and in order to increase the interest and attractiveness of the structure, the reflecting surface of the disc or plate 25 may have painted or pasted thereupon the representations of trees, foliage, buildings and the like so that the reflected figures of the bird or birds and the pivoted figures 22 will as the revolving member operates, appear to pass behind the foliage and trees that are arranged on the face of the reflecting member.

The circumferential wall 14 is provided in one side with a hinged section 26 that serves as a door to give access to the interior of the cage.

One or more perches may be secured to the plate or disc 25 and project forwardly in the cage so as to afford fixed resting places for the bird or birds while roosting at night.

Thus it will be seen that I have provided a bird cage having a revolving portion that may be actuated by the weight of the bird that occupies the cage and said revolving member being disposed in front of a reflecting surface, thereby materially increasing the interest and attractiveness of the cage and the bird or birds that occupy the same.

It will be understood that minor changes in the size form and construction of the various parts of my improved bird cage may be made and substituted for those herein shown and described without departing from the spirit of my invention, the scope of which is set forth in the appended claims.

I claim as my invention:

1. A bird cage, a member forming the front wall of said cage, which member is mounted for rotation, perches projecting inwardly from said rotary member, a reflector arranged in a cage to the rear of said rotary member and animal or bird representing figures loosely suspended from said perches.

2. In a bird cage, a reticulated front wall member mounted for rotation, perches carried by said front wall member, a reflecting surface arranged to the rear of said front wall member and portions of which reflecting surface are covered with the representation of trees, foliage, buildings or the like.

3. In a bird cage, a reticulated front wall member mounted for rotation, perches carried by said front wall member, a reflecting surface arranged to the rear of said front wall member, portions of which reflecting surface are covered with the representation of trees, foliage, buildings or the like and animal or bird representing figures loosely suspended from said perches.

4. In a bird cage, a reticulated front wall member mounted for rotary movement, perches carried by said front wall member and projecting into the cage, rigidly fixed strips of resilient metal arranged in front of said front wall member, and fingers carried by said front wall member, which fingers are adapted to engage the free ends of said fixed resilient strips.

In testimony whereof, I affix my signature.

CHARLES F. CLAMPITT.